(12) United States Patent
Bishoff et al.

(10) Patent No.: US 10,527,182 B2
(45) Date of Patent: Jan. 7, 2020

(54) PRESSURE REGULATOR WITH SHUTOFF MECHANISM

(71) Applicant: LORAX SYSTEMS INC., Halifax (CA)

(72) Inventors: Mark Bishoff, Halifax (CA); Guy Bishoff, Lethbridge (CA)

(73) Assignee: Lorax Systems Inc., Halifax (CA)

( * ) Notice: Subject to any disclaimer, the term of this patent is extended or adjusted under 35 U.S.C. 154(b) by 57 days.

(21) Appl. No.: 15/737,488

(22) PCT Filed: Jun. 22, 2016

(86) PCT No.: PCT/IB2016/053724
§ 371 (c)(1),
(2) Date: Dec. 18, 2017

(87) PCT Pub. No.: WO2016/207818
PCT Pub. Date: Dec. 29, 2016

(65) Prior Publication Data
US 2018/0156347 A1 Jun. 7, 2018

Related U.S. Application Data

(60) Provisional application No. 62/183,404, filed on Jun. 23, 2015.

(51) Int. Cl.
*F16K 17/04* (2006.01)
*G05D 16/06* (2006.01)
*F16K 17/164* (2006.01)

(52) U.S. Cl.
CPC .......... *F16K 17/048* (2013.01); *F16K 17/044* (2013.01); *F16K 17/164* (2013.01); *G05D 16/0697* (2013.01); *Y10T 137/783* (2015.04)

(58) Field of Classification Search
CPC .... F16K 17/048; F16K 17/044; F16K 17/164; G05D 16/0697; Y10T 137/783;
(Continued)

(56) References Cited

U.S. PATENT DOCUMENTS

| | | | | |
|---|---|---|---|---|
| 1,450,236 A | * | 4/1923 | Anderson | G05D 16/0683 137/505.18 |
| 1,637,085 A | * | 7/1927 | Nichols | B60S 5/04 137/224 |

(Continued)

FOREIGN PATENT DOCUMENTS

WO    WO-2007056865 A1 *  5/2007  ........... F16K 17/366

*Primary Examiner* — William M McCalister
(74) *Attorney, Agent, or Firm* — Harness, Dickey & Pierce, PLC

(57) ABSTRACT

A pressure regulator including a body having a body inlet, a body outlet and a fluid passageway defined therebetween for allowing a fluid to be dispensed therethrough, the body further including a pressure control chamber adapted to receive a control fluid at a control pressure; a valve disposed in the fluid passageway for restricting flow of the fluid through the fluid passageway; a regulating member operatively connected to the valve for adjusting the position of the valve so as to maintain the fluid in the fluid passageway at a nominal pressure; a pressure sensor disposed between the control chamber and the fluid passageway for sensing a difference between the nominal pressure and the control pressure; and a resilient shutoff member operatively connected to the valve and the pressure sensor for closing the valve when the difference between the nominal pressure and the control pressure is below a predetermined threshold value.

16 Claims, 3 Drawing Sheets

(58) Field of Classification Search
CPC ......... Y10T 137/7821; Y10T 137/7826; Y10T 137/7829
USPC ............ 137/505.38, 505.37, 505.42, 505.45
See application file for complete search history.

(56) References Cited

U.S. PATENT DOCUMENTS

| | | | | |
|---|---|---|---|---|
| 1,858,471 A * | 5/1932 | Smith | ................... | F25B 41/062 137/505.29 |
| 2,148,618 A * | 2/1939 | Hallum | .............. | G05D 16/0694 137/505.46 |
| 2,691,988 A * | 10/1954 | Weatherhead, Jr. | ......................... | G05D 16/0683 137/377 |
| 2,694,410 A * | 11/1954 | Ey | ..................... | G05D 16/0688 137/116.5 |
| 2,858,845 A * | 11/1958 | Ensign | ............... | G05D 16/0697 137/340 |
| 2,896,599 A * | 7/1959 | Ensign | ................... | F02M 21/00 123/179.16 |
| 2,952,272 A * | 9/1960 | Hansen | ................. | F02M 21/00 123/179.17 |
| 3,048,185 A * | 8/1962 | Howard | ............. | G05D 16/0694 137/103 |
| 3,223,116 A * | 12/1965 | Criddle | ..................... | F16K 7/00 137/505.13 |
| 3,339,581 A * | 9/1967 | Courtot | ............. | G05D 16/0683 137/505.46 |
| 3,368,923 A * | 2/1968 | Smith | ..................... | F04F 5/461 137/505.46 |
| 4,627,459 A * | 12/1986 | Gulko | ................ | G05D 16/0697 137/116.5 |
| 4,821,767 A * | 4/1989 | Jackson | ................. | A62B 9/027 128/204.26 |
| 4,972,871 A * | 11/1990 | Rice | ................... | G05D 16/0694 137/484.4 |
| 5,000,221 A * | 3/1991 | Palmer | ................. | B08B 15/023 137/505.38 |
| 5,131,425 A * | 7/1992 | Sturgis | ............... | G05D 16/0683 137/116.5 |
| 5,456,281 A * | 10/1995 | Teay | ................... | G05D 16/0683 137/505.12 |
| 5,740,833 A * | 4/1998 | Olds | ................... | G05D 16/0683 137/505.12 |
| 5,765,588 A * | 6/1998 | Katz | ................... | A01K 39/0213 137/238 |
| 5,797,425 A * | 8/1998 | Carter | ................ | G05D 16/0677 137/505.46 |
| 6,167,905 B1* | 1/2001 | Malloy | .............. | G05D 16/0688 137/484.4 |
| 8,167,001 B2* | 5/2012 | Larsen | ................. | G05D 16/106 137/883 |
| 9,195,240 B2 | 11/2015 | Bishoff et al. | | |
| 2004/0187930 A1* | 9/2004 | Hawkins | ............ | G05D 16/0686 137/505.47 |
| 2006/0065307 A1* | 3/2006 | Schmidt | ................. | G05D 16/02 137/505.46 |
| 2006/0260692 A1* | 11/2006 | Pechtold | ............ | G05D 16/0672 137/505.42 |
| 2009/0071548 A1* | 3/2009 | Patterson | ............. | G05D 16/103 137/497 |
| 2011/0192999 A1* | 8/2011 | Wykle | ................ | G05D 16/0683 251/129.01 |
| 2012/0111425 A1* | 5/2012 | Hawkins | ............ | G05D 16/0683 137/489 |
| 2012/0266980 A1* | 10/2012 | Olbrisch | ................ | E21B 34/10 137/515 |
| 2013/0146157 A1* | 6/2013 | Hsiao | ................ | G05D 16/0691 137/505.39 |
| 2014/0261787 A1* | 9/2014 | Blanchard | .......... | G05D 16/0683 137/505 |
| 2016/0076683 A1 | 3/2016 | Bishoff et al. | | |

\* cited by examiner

PRESSURE REGULATOR WITH SHUTOFF MECHANISM

CROSS-REFERENCE TO RELATED APPLICATIONS

This application is a National Phase Entry of International Application No. PCT/IB2016/053724, filed on Jun. 22, 2016, which claims priority to U.S. Provisional Application No. 62/183,404 filed Jun. 23, 2015, both of which are incorporated by reference herein.

TECHNICAL FIELD

The invention relates to pressure regulators, and more specifically to pressure regulators with shutoff mechanisms.

BACKGROUND

Pressure regulators are used to control the pressure of a fluid, usually gas, being dispensed from a fluid source. Pressure regulators are typically used when the fluid is dispensed from the fluid source at a relatively high pressure which needs to be reduced for the fluid to be usable in machines or appliances. For example, propane is usually stored in propane cylinders at a relatively high pressure and is dispensed through a pressure regulator to a cooking apparatus such as a barbecue grill at a relatively low pressure.

A pressure regulator typically comprises a flexible membrane (or diaphragm) operatively connected to a valve adapted to restrict the flow of fluid in a conduit. The diaphragm senses the pressure of the fluid inside the pressure regulator and adjusts the position of the valve such that the pressure of the fluid dispensed from the pressure regulator is maintained at a desired pressure.

Unfortunately, most pressure regulators do not comprise any safety shutoff mechanism to prevent the fluid from being dispensed in case of a leak. A leak in the pressure regulator or in the gas line downstream of the regulator would not disturb the operation of the pressure regulator, which would continue to dispense fluid that would leak out in the environment. This may be both dangerous to the user and damaging for the environment. There is therefore a need for a new pressure regulator which would address at least one of the above-identified drawbacks.

SUMMARY

According to one aspect, there is provided a pressure regulator comprising: a body having a body inlet, a body outlet and a fluid passageway defined therebetween for allowing a fluid to be dispensed therethrough, the body further comprising a pressure control chamber adapted to receive a control fluid at a control pressure; a valve disposed in the fluid passageway for restricting flow of the fluid through the fluid passageway; a regulating member operatively connected to the valve for adjusting the position of the valve so as to maintain the fluid in the fluid passageway at a nominal pressure; a pressure sensor disposed between the control chamber and the fluid passageway for sensing a difference between the nominal pressure and the control pressure; and a resilient shutoff member operatively connected to the valve and to the pressure sensor for closing the valve when the difference between the nominal pressure and the control pressure is below a predetermined threshold value.

In one embodiment, the control pressure is higher than the nominal pressure. In one embodiment, the control pressure is lower than the nominal pressure.

In one embodiment, the pressure regulator further comprises a dispensing conduit having a first end coupled to the body outlet and a second end. In one embodiment, the dispensing conduit comprises an inner sidewall defining a main passageway and an outer sidewall outwardly spaced from the inner sidewall to define an interstitial space therebetween, the main passageway being in fluid communication with the fluid passageway and the interstitial space being in fluid communication with the pressure control chamber.

In one embodiment, the valve comprises a movable valve member and a seat for receiving the movable valve member. In one embodiment, the movable valve member comprises an arm pivotably mounted to the body. In one embodiment, the arm comprises a first end adapted to close the outlet and a second end operatively connected to the resilient shutoff member and the regulating member.

In one embodiment, the regulating shutoff member further comprises a linking member having a first end connected to the regulating member and a second end connected to the arm, the resilient shutoff member extending between the body and the linking member for moving the linking member relative to the body. In one embodiment, the linking member comprises a lower end operatively connected to the resilient shutoff member and an upper end, the linking member extending through the regulating member. In one embodiment, the linking member further comprises an opening located near its lower end for receiving the second end of the arm. In one embodiment, the arm is unattached to the linking member and further wherein the opening is wider than the second end of the arm to allow the arm to pivot within the opening when the linking member moves towards and away from the resilient shutoff member.

In one embodiment, the regulating member comprises a flexible regulating membrane extending adjacent to the fluid passageway and a resilient regulating member operatively connected to the flexible regulating membrane, the flexible regulating membrane being operatively connected to the movable valve member such that movement of the flexible regulating membrane moves the movable valve member, the resilient regulation member being adapted for counteracting the nominal pressure to limit movement of the flexible regulating membrane such that the movable valve member is moved to a position corresponding to the nominal pressure. In one embodiment, the resilient regulating member is adjustable to allow the nominal pressure to be adjusted. In one embodiment, the pressure sensor comprises a flexible shutoff membrane extending between the control chamber and the fluid passageway, the flexible shutoff membrane being adapted to move when the difference between the nominal pressure and the control pressure changes, the flexible shutoff membrane being operatively connected to the movable valve member.

In one embodiment, the nominal pressure is about 2.758 kPag. In one embodiment, the control pressure is greater than 3.447 kPag. In one embodiment, at least of a portion of the pressure control chamber is adjacent to at least a portion of the fluid passageway. In one embodiment, the resilient shutoff member is a helical spring.

DETAILED DESCRIPTION

Figure 1:
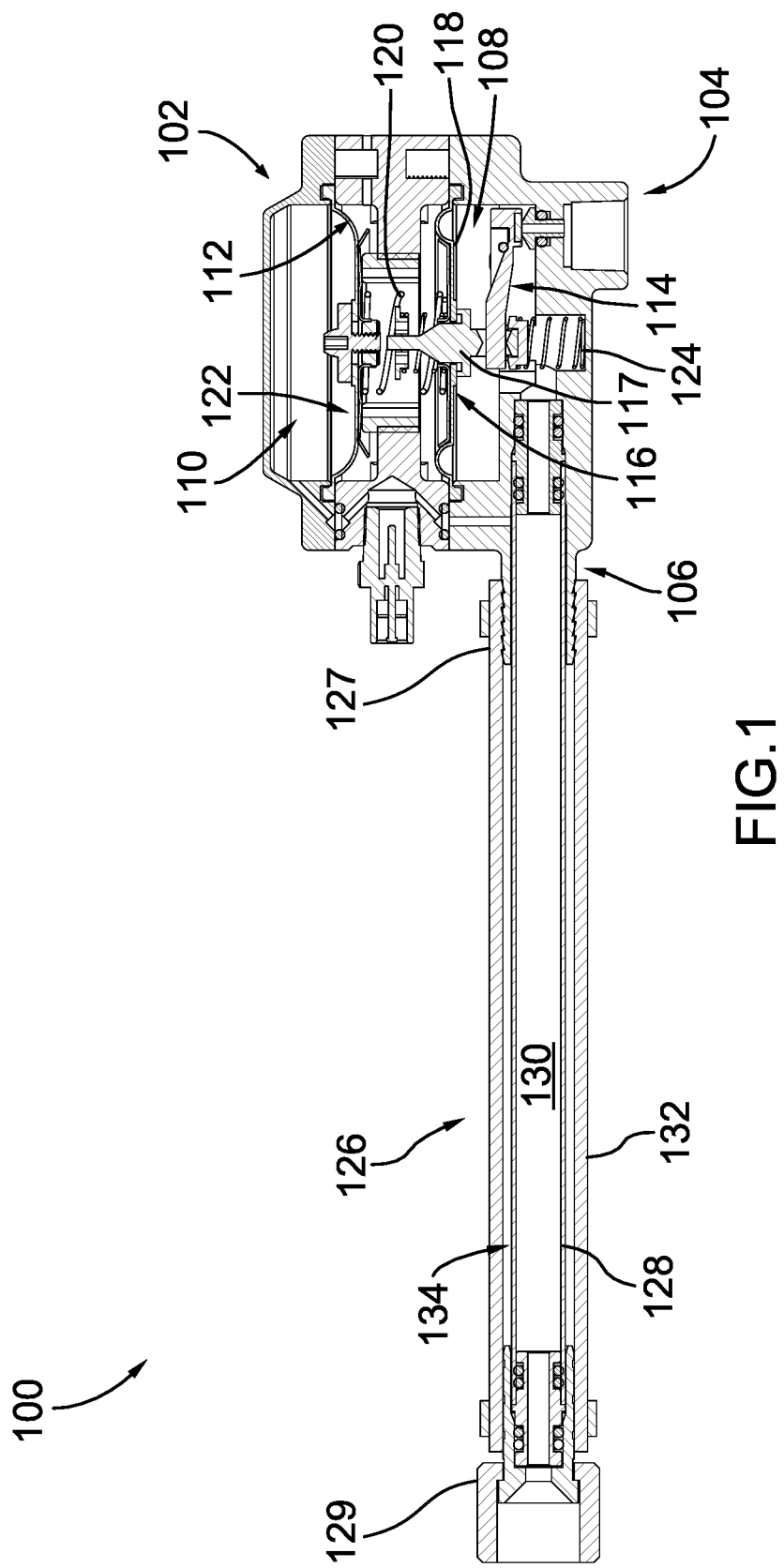
FIG. 1 is a cross-section view of a pressure regulator, in accordance with one embodiment, with the pressure regulator in a normal operation configuration.

Referring to FIG. 1, there is provided a pressure regulator 100, in accordance with one embodiment. The pressure regulator 100 comprises a hollow body 102 which has a body inlet 104, a body outlet 106 and a fluid passageway 108 defined between the body inlet 104 and the body outlet 106. The fluid passageway 108 allows a fluid entering the body 102 through the body inlet 104 to be dispensed from the body outlet 106.

In one embodiment, the fluid comprises a gas, such as propane gas. Alternatively, the fluid could instead comprise a liquid, such as water, or any other fluid considered by a skilled person to be suitable for use with the present pressure regulator.

Still referring to FIG. 1, the pressure regulator 100 further comprises a pressure control chamber 110. Specifically, the pressure control chamber 110 is defined in the body 102 by a flexible shutoff membrane 112. The pressure control chamber 110 is adapted to receive a control fluid at a control pressure, as will be further explained below.

Still referring to FIG. 1, the pressure regulator 100 is adapted to regulate the pressure of the fluid dispensed through the body outlet 106. Specifically, the pressure regulator 100 further comprises a valve 114 disposed in the fluid passageway 108. The valve 114 is adapted to restrict the flow of fluid through the fluid passageway 108. It will be appreciated that by controlling the flow of fluid through the fluid passageway 108, the pressure of the fluid dispensed through the body outlet 106 may also be controlled. In the illustrated embodiment, the position of the valve 114 is controlled by a regulating member 116 which is operatively connected to the valve 114 via a linking member 117. Specifically, the regulating member 116 comprises a flexible regulating membrane 118 which is disposed adjacent the fluid passageway 108. The regulating member 116 further comprises a resilient regulating member 120 extending between the regulating membrane 118 and the shutoff membrane 112. In the illustrated embodiment, the resilient regulating member 120 comprises a helical spring. Alternatively, the resilient regulating member 120 could comprise any other type of resilient elements known to the skilled addressee.

When the pressure of the fluid builds inside the fluid passageway, the fluid exerts a force on the regulating membrane 118, which is urged towards the resilient regulating member 120. The regulating membrane 118 is operatively connected to the valve 114 and moves the valve 114 such that it increasingly restricts fluid flow as the regulating membrane 118 moves towards the resilient regulating member 120, thereby lowering the pressure of the fluid within the fluid passageway as will be appreciated by the skilled addressee.

As the regulating membrane 118 moves towards the resilient regulating member 120, the resilient regulating member 120 is further compressed and exerts an increasing force on the regulating membrane 118. Since the force exerted by the regulating membrane 118 is decreasing as the valve 114 is increasingly restricting fluid flow through the fluid passageway 108, the regulating membrane 118 will be urged away from the resilient regulating member 120, which will tend to decrease the restriction of fluid flow through the fluid passageway 108 by the valve 114.

In this configuration, the system defined by the valve 114, the regulating membrane 118 and the resilient regulating member 120 will therefore tend towards a state in which an equilibrium is formed and maintained between the force exerted by the resilient regulating member 120 and the force exerted on the regulating membrane 118 by the fluid in the fluid passageway 108. In this state, the fluid in the fluid passageway 108 is at a nominal pressure. It will be appreciated that it is possible to select a suitable resilient member, membrane and valve to obtain a desired nominal pressure. It will also be appreciated that it could be possible to adjust the selected resilient member, membrane and valve to modify the nominal pressure.

Still referring to FIG. 1, the pressure regulator 100 further comprises a pressure sensor 122 adapted to sense a pressure difference between the nominal pressure of the fluid in the fluid passageway 108 and the control pressure of the control fluid in the pressure control chamber 110. In the illustrated embodiment, the pressure sensor 122 is defined by the shutoff membrane 112. Specifically, the control pressure of the control fluid in the pressure control chamber 110 exerts a force on the shutoff membrane 112, which is urged away from the pressure control chamber 110.

The pressure regulator 100 further comprises a resilient shutoff member 124 operatively connected to both the valve 114 and the pressure sensor 122. Specifically, the resilient shutoff member 124 abuts the linking member 117 which is connected to the regulating membrane 118, and the resilient regulating member 120 is disposed between and abuts both the regulating membrane 118 and the shutoff membrane 112.

In the embodiment illustrated in FIG. 1, the control pressure of the control fluid is higher than the nominal pressure when the pressure regulator 100 is in a normal operating mode. In this configuration, the shutoff membrane 112 is convex towards the resilient shutoff member 124, as shown in FIG. 1. The resilient shutoff member 124 is therefore compressed by the force exerted by the control fluid on the shutoff membrane 112. As it is compressed, the resilient shutoff member 124 exerts a force in a direction opposite the force exerted by the control fluid. In this configuration, the force exerted by the resilient shutoff member 124 on the shutoff membrane 112 counteracts the force exerted by the control fluid on the shutoff membrane 112 and the system is at equilibrium.

Figure 3:
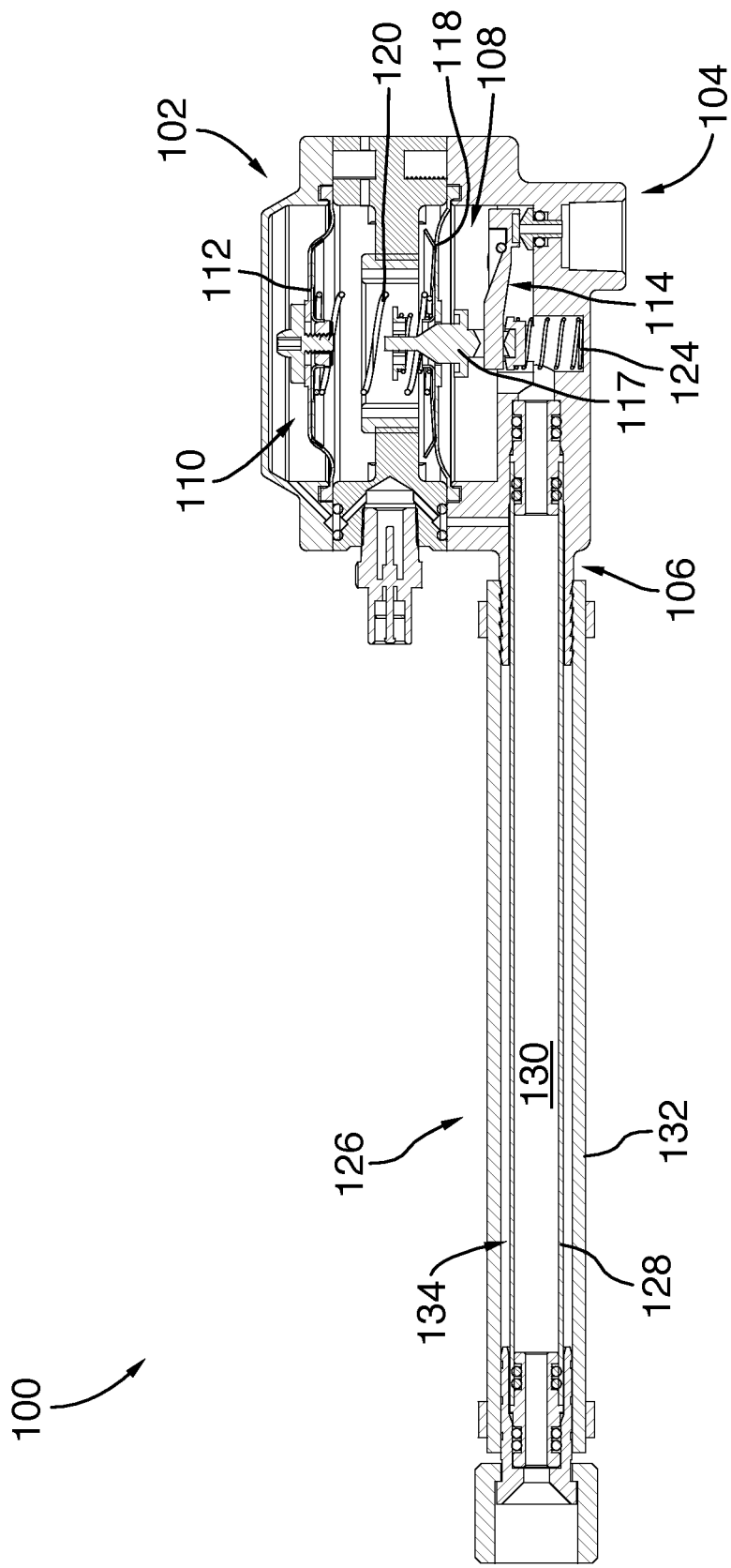
FIG. 3 is yet another cross-section view of the pressure regulator shown in FIG. 1, with the pressure regulator in a shutoff configuration.

Referring now to FIG. 3, if the control pressure of the control fluid decreases, the difference between the control pressure and the nominal pressure also decreases. When the difference between the control pressure and the nominal pressure decreases such that it is below a predetermined threshold value, the force exerted by the control fluid on the shutoff membrane 112 decreases and the resilient shutoff member 124 moves the entire regulating member 116, including the linking member 117, the regulating membrane 118 and the resilient regulating member 120, towards the pressure control chamber 110. Since the linking member 117 is operatively connected to the valve 114, this movement allows the resilient shutoff member 124 to close the valve 114 to thereby completely restrict the flow of fluid through the fluid passageway 108, effectively placing the pressure regulator 100 in a shutoff mode.

As shown in FIG. 3, a decrease in the control pressure also moves the shutoff membrane 112 upwardly. This causes the resilient regulating member 120, which is connected to the shutoff membrane 112, to be extended, and thereby also exerts a pulling force on the valve 114 which contributes to moving and maintaining the valve 114 closed.

Figure 2:
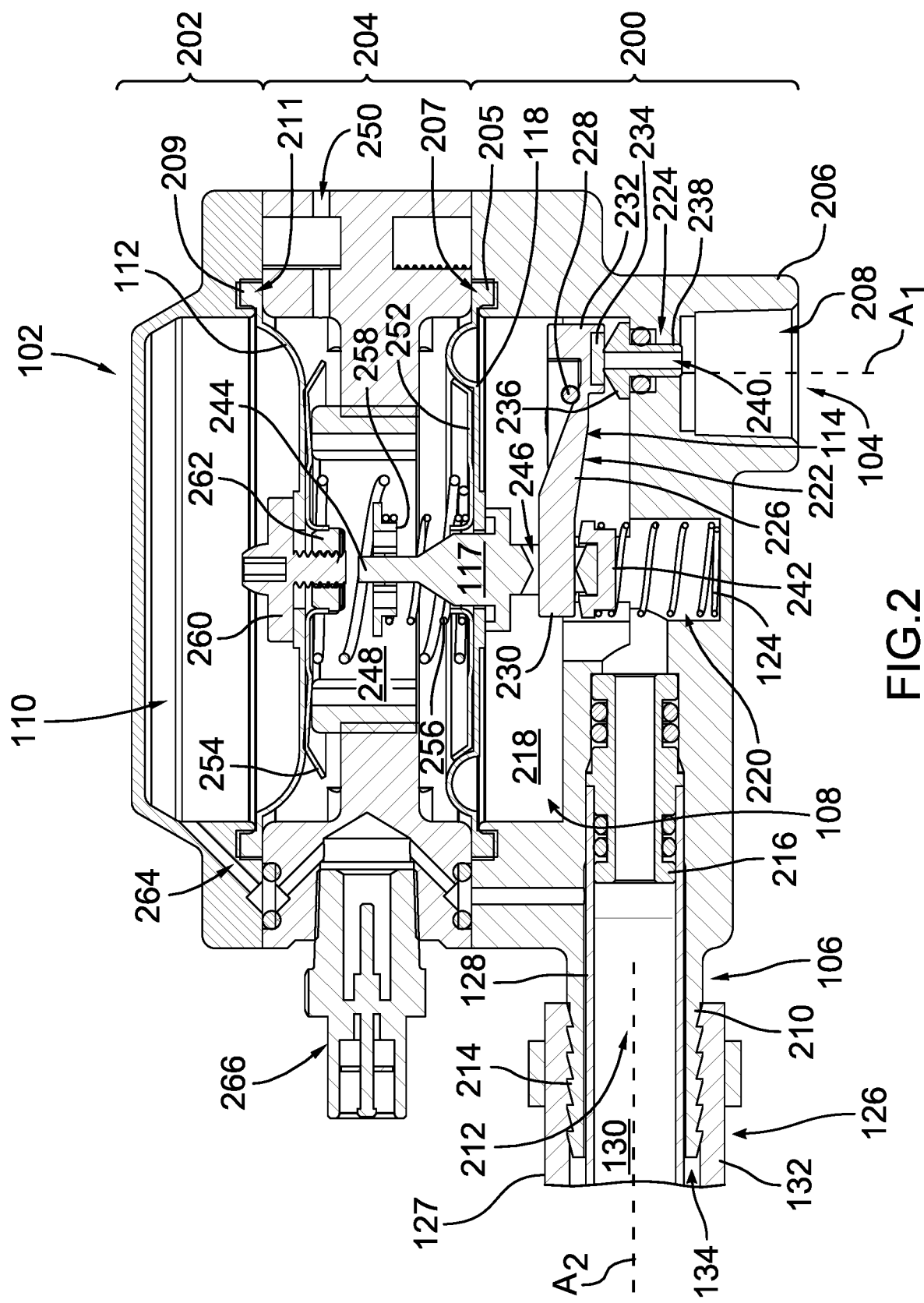
FIG. 2 is another cross-section view, enlarged, of the pressure regulator shown in FIG. 1, with the pressure regulator in a normal operation configuration.

It will be appreciated that in the embodiment illustrated in FIGS. 1 to 3, the control pressure of the control fluid could decrease in the event of a leak from the pressure control chamber 110. The leak could comprise a leak from the pressure control chamber 110 to an exterior environment in which the pressure regulator 100 is used. The leak could also comprise a leak from the pressure control chamber 110 into the fluid passageway 108. In the illustrated embodiment, the pressure regulator 100 further comprises a dispensing conduit 126 having a first end 127 adapted to be connected to the body 102 and a second end 129 adapted to be connected to a machine, appliance or circuit to which the fluid is to be dispensed at the nominal pressure.

In one embodiment, the machine, appliance or circuit comprises a barbecue grill. In an embodiment in which the fluid comprises water, the machine, appliance or circuit could instead comprise a water distribution circuit. Alternatively, the machine, appliance or circuit may comprise any machine, appliance or circuit that a skilled person would consider appropriate to be used with the pressure regulator 100.

In the illustrated embodiment, the dispensing conduit 126 comprises an inner sidewall 128 which defines a main dispensing passageway 130 and an outer sidewall 132 which is outwardly spaced from the inner sidewall 128 to define an interstitial space 134 between the inner sidewall 128 and the outer sidewall 132. The main dispensing passageway 130 is in fluid communication with the fluid passageway 108 of the body 102 and the interstitial space 134 is in fluid communication with the pressure control chamber 110, as will be further explained below. In this configuration, the interstitial space 134 therefore defines an extension of the pressure control chamber 110 while the main dispensing passageway 130 defines an extension of the fluid passageway 108 of the body 102. Since the main dispensing passageway 130 is only separated from the interstitial space 134 by the inner sidewall 128, the pressure control chamber 110 is therefore adjacent to the fluid passageway 108.

As explained above, the control pressure is higher than the nominal pressure in the embodiment illustrated in FIGS. 1 to 3. In this configuration, a leak through the inner sidewall 128 would cause the control pressure to decrease such that the difference between the control pressure and the nominal pressure becomes lower than the predetermined threshold value. The control pressure may also be higher than an exterior environment pressure, and a leak through the outer sidewall 132 to the exterior of the pressure regulator 100 would therefore also cause the control pressure to drop such that the difference between the control pressure and the nominal pressure becomes lower than the predetermined threshold value. Alternatively, the pressure control chamber 110 may not be adjacent to the fluid passageway and the valve 114 may only be closed by the resilient shutoff member 124 when a leak is formed through the outer sidewall 132.

In one embodiment, the difference between the control pressure and the nominal pressure in a normal operating mode could be substantially equal to the predetermined threshold pressure. In other words, the slightest drop in pressure from the initial control pressure would signal a leak and the valve 114 would immediately be closed. In another embodiment, the predetermined threshold value is below the initial difference between the control pressure and the nominal pressure, such that a loss of a certain amount of control fluid is allowed before the valve 114 is closed by the resilient shutoff member 124.

Now referring to FIG. 2, the body 102 comprises a lower body portion 200, an upper body portion 202 and an intermediate body portion 204 located between the lower and upper body portions 200, 202. The lower, upper and intermediate body portions 200, 202, 204 are assembled together using assembly techniques known to the skilled addressee such as fastening, welding or the like.

In the illustrated embodiment, the regulating membrane 118 is clamped between the lower body portion 200 and the intermediate body portion 204, and the shutoff membrane 112 is clamped between the intermediate body portion 204 and the upper body portion 202. Specifically, the regulating membrane 118 comprises a peripheral frame 205 which is sized and shaped to be received in a corresponding peripheral recess 207 of the lower body portion 200. The peripheral recess 207 is covered by the intermediate body portion 204 when the intermediate body portion 204 is assembled with the lower body portion 200 such that the regulating membrane 118 can no longer be removed from the peripheral recess 207.

In one embodiment, the regulating membrane 118 and the peripheral frame 205 are circular. Alternatively, the regulating membrane 118 and the peripheral frame 205 could have any other shape considered by the skilled addressee to be appropriate for use with the pressure regulator 100. Similarly, the shutoff membrane 112 comprises a peripheral frame 209 which is sized and shaped to be received in a corresponding peripheral recess 211 of the upper body portion 202. The peripheral recess 211 is covered by the intermediate body portion 204 when the intermediate body portion 204 is assembled with the upper body portion 202 such that the shutoff membrane 112 can no longer be removed from the peripheral recess 211.

In one embodiment, the shutoff membrane 112 and the peripheral frame 209 are circular. Alternatively, the shutoff membrane 112 and the peripheral frame 209 could have any other shape considered by the skilled addressee to be appropriate for use with the pressure regulator 100.

In the illustrated embodiment, the body inlet 104, the body outlet 106 and the fluid passageway 108 are defined in the lower body portion 200. Specifically, the body inlet 104 comprises a tubular projection 206 which extends away from the lower body portion 200 and an inlet bore 208 extending from the tubular projection 206 inwardly into the lower body portion 200. The inlet bore 208 is sized and shaped to receive a corresponding outlet connector from a fluid source, such as a propane cylinder. Still in the illustrated embodiment, the body outlet 106 comprises a cylindrical outlet nipple 210 extending away from the lower body portion 110 and an outlet bore 212 extending from the outlet nipple 210 inwardly into the lower body portion 200.

In one embodiment, the outlet nipple 210 is sized and shaped to receive the first end 127 of the dispensing conduit 126. Specifically, the outlet nipple 210 may comprise a plurality of hose barbs 214 which are adapted to engage the outer sidewall 132 of the dispensing conduit 126. In the illustrated embodiment, the inner sidewall 128 extends into the outlet bore 212 and a tubular sealing insert 216 sealingly connects the main dispensing passageway 130 of the dispensing conduit 126 to the fluid passageway 108.

In the embodiment illustrated in FIG. 2, the body inlet 104 defines an inlet axis $A_1$ and the body outlet 106 defines an outlet axis $A_2$ which is orthogonal to the inlet axis $A_1$. Alternatively, the body inlet 104 and the body outlet 106 could instead be located on opposite sides of the body 102 such that the inlet axis $A_1$ and the outlet axis $A_2$ are parallel to each other.

Still referring to FIG. 2, the fluid passageway 108 comprises a lower body chamber 218 which is in fluid communication with both the inlet bore 208 and the outlet bore 212. In the illustrated embodiment, the lower body chamber 218 houses the valve 114 and the resilient shutoff member 124.

More specifically, the resilient shutoff member 124 is received in a recess 220 defined in the lower body portion 200, inside the lower body chamber 218. In the illustrated embodiment, the resilient shutoff member 124 comprises a helical spring. Alternatively, the resilient shutoff member 124 could comprise any other type of resilient elements known to the skilled addressee.

In the illustrated embodiment, the valve 114 comprises a movable valve member 222 and a seat 224 for receiving the movable valve member 222. More specifically, the movable valve member 222 comprises an arm 226 pivotably mounted to the body 102 via a pivot shaft 228. The arm 226 comprises a first arm end 230 located towards the resilient shutoff member 124 and a second arm end 232 located near the seat 224. The second arm end 232 is adapted for abutting the seat 224 and form a seal therewith to thereby close the valve 114.

Still in the illustrated embodiment, the pivot shaft 228 is located closer to the second arm end 232 than to the first arm end 230. It will be appreciated that this allows the arm 226, acting as a lever, to exert a relatively greater force on the seat 224 in order to provide a relatively tight seal when the valve 114 is closed. In the illustrated embodiment, the arm 226 further comprises an elastomeric pad 234 secured to the second arm end 232 to further provide a relatively tight seal when the valve 114 is closed.

Still referring to FIG. 2, the seat 224 comprises a generally conical head 236 and an elongated body 238 extending away from the conical head 236. The seat 224 further comprises a central bore 240 and is mounted through the lower body portion 200 to allow fluid communication between the inlet bore 208 and the lower body chamber 218.

In the illustrated embodiment, the linking member 117 extends through the regulating membrane 118 and comprises a lower end 242 operatively connected to the resilient shutoff member 124 and an upper end 244 located within the intermediate body portion 204. The linking member 117 further comprises an opening 246 located near its lower end 242 for receiving the first arm end 230 of the arm 226. Specifically, the first arm end 230 is simply inserted in the opening 246 and is unattached to the linking member 117. In the illustrated embodiment, the opening 246 is wider than the first arm end 230 to allow the arm 226 to pivot within the opening 246 when the linking member 117 moves towards and away from the resilient shutoff member 124.

Still referring to FIG. 2, the intermediate body portion 204 defines an intermediate body chamber 248 which houses the resilient regulating member 120. The intermediate body chamber 248 is in fluid communication with the environment via a vent 250 extending through the intermediate body portion 204. The pressure inside the intermediate body chamber 248 is therefore the same as the exterior environment pressure.

The resilient regulating member 120 extends between the regulating membrane 118 and the shutoff membrane 112. In the illustrated embodiment, a first spreader disc 252 is further provided on the regulating membrane 118 to receive the resilient regulating member 120 and spread the force exerted by the resilient regulating member 120 evenly on the regulating membrane 118. Similarly, a second spreader disc 254 is also provided on the shutoff membrane 112 to receive the resilient regulating member 120 and spread the force exerted by the resilient regulating member 120 evenly on the shutoff membrane 112.

Each spreader disc 252, 254 may be secured to its respective membrane 118, 112. Alternatively, the spreader discs 252, 254 may instead be secured to the resilient regulating member 120. In yet another embodiment, the spreader discs 252, 254 are not secured to the membranes 118, 112 or to the resilient regulating member 120.

In the illustrated embodiment, the intermediate body chamber 248 further houses a relief spring 256 disposed around the linking member 117. The relief spring 256 is further prevented from moving away from the linking member 117 by a retainer ring 258 secured to the linking member 117. The relief spring 256 is adjusted such that if the pressure of the fluid inside the fluid passageway 108 exceeds a predetermined upper limit, the pressure from the fluid will exert a force on the regulating membrane 118 and will push the regulating membrane 118 and the linking member 117 away from the fluid passageway 108 until the linking member 117 can no longer move. The fluid will then continue to exert a force on the regulating membrane 118 and compress the relief spring 256 until it is moved sufficiently relative to the linking member 117 such that a gap is created between the regulating membrane 118 and the linking member 117, by which the fluid may flow into the intermediate body chamber 248 and be vented to the exterior environment through the vent 250.

Still in the illustrated embodiment, a plug screw 260 and a corresponding plug nut 262 engage the shutoff membrane 112 in order to seal a hole at the center of the shutoff membrane 112. Alternatively, the plug screw 260 and the plug nut 262 are not provided and the shutoff membrane 112 is continuous (i.e. the shutoff membrane 112 does not comprise a central hole).

Still referring to FIG. 2, a pressure control channel 264 is further defined in the body 102. Specifically, the pressure control channel 264 extends between the pressure control chamber 110 and the outlet bore 212 and is adapted to be in fluid communication with the interstitial space 134 of the dispensing conduit 126.

In the illustrated embodiment, a filling valve 266, for example a poppet valve, is further mounted in the body 102, in fluid communication with the pressure control channel 264 and/or the pressure control chamber 110 to allow the control fluid to be dispensed within the pressure control chamber 110 until the control pressure is obtained. Alternatively, the pressure regulator 100 does not comprise a filling valve 266 and is instead pressurized and then sealed with the control fluid at the desired control pressure.

It will be understood that in the embodiment described above, the control pressure is greater than the exterior environment pressure, and may also be greater than the nominal pressure. For example, the nominal pressure could be about 0.4 psig (psi gauge) or about 2.758 kPag (kPa gauge) and the control pressure could be above about 0.5 psig or about 3.447 kPag.

Alternatively, the control pressure could instead be lower than the exterior pressure and the nominal pressure. For example, the resilient shutoff member 124 could instead be extended when the pressure regulator 100 is in normal operating mode, and pull the linking member 117 to thereby close the valve 114 when the control pressure increases such that the difference between the control pressure and the nominal pressure decreases below the predetermined threshold value. Alternatively, the resilient shutoff member 124 could instead be located inside the pressure control chamber 110 to move the shutoff membrane 112 away from the pressure control chamber 110 when the control pressure rises above the predetermined threshold value, thereby closing the valve 114.

The pressure regulator 100 therefore constitutes a simple and efficient way to provide pressure regulation of a fluid with a shutoff feature which is activated when a leak of fluid is detected, which may help prevent loss of fluid which could be costly, wasteful, damaging to the environment and potentially harmful. Furthermore, the pressure regulator 100 is relatively simple and eliminates the need for multiple valves by having the fluid regulation and the shutoff function performed by the same valve.

The invention claimed is:

1. A pressure regulator comprising:
   a body having a body inlet, a body outlet, and a fluid passageway defined therebetween for allowing a fluid to be dispensed therethrough, the body further comprising a pressure control chamber adapted to receive a control fluid at a control pressure;
   a valve disposed in the fluid passageway for restricting flow of the fluid through the fluid passageway;
   a regulating member operatively connected to the valve for adjusting the position of the valve so as to maintain the fluid in the fluid passageway at a nominal pressure, the regulating member comprising:
      a flexible regulating membrane extending adjacent to the fluid passageway, the flexible regulating membrane being operatively connected to the valve such that movement of the flexible regulating membrane moves the valve;
      a resilient regulating member operatively connected to the flexible regulating membrane, the resilient regulating member being adapted for counteracting the nominal pressure to limit movement of the flexible regulating membrane such that the valve is moved to a position corresponding to the nominal pressure; and
      a linking member having a lower end and an upper end, the linking member operatively connected to the valve, the linking member extending through the flexible regulating membrane, and wherein at least a portion of the linking member is disposed within the resilient regulating member;
   a pressure sensor disposed between the pressure control chamber and the fluid passageway for sensing a difference between the nominal pressure and the control pressure, the pressure sensor comprising a flexible shutoff membrane extending between the control chamber and the fluid passageway, the flexible shutoff membrane being adapted to move when the difference between the nominal pressure and the control pressure changes, the flexible shutoff membrane being operatively connected to the movable valve member, and wherein the resilient regulating member is disposed between the flexible regulating membrane and the flexible shutoff membrane;
   a relief spring disposed around the linking member, the relief spring operatively connected to the flexible regulating membrane;
   a retainer ring secured to the linking member, wherein the relief spring is prevented from moving away from the linking member by the retainer ring; and
   a resilient shutoff member operatively connected to the linking member, the valve, and the pressure sensor for closing the valve when the difference between the nominal pressure and the control pressure is below a predetermined threshold value.

2. The pressure regulator as claimed in claim 1, wherein the control pressure is higher than the nominal pressure.

3. The pressure regulator as claimed in claim 1, wherein the control pressure is lower than the nominal pressure.

4. The pressure regulator as claimed in claim 1, further comprising a dispensing conduit having a first end coupled to the body outlet and a second end.

5. The pressure regulator as claimed in claim 4, wherein the dispensing conduit comprises an inner sidewall defining a main passageway and an outer sidewall outwardly spaced from the inner sidewall to define an interstitial space therebetween, the main passageway being in fluid communication with the fluid passageway and the interstitial space being in fluid communication with the pressure control chamber.

6. The pressure regulator as claimed in claim 1, wherein the valve comprises a movable valve member and a seat for receiving the movable valve member.

7. The pressure regulator as claimed in claim 6, wherein the movable valve member comprises an arm pivotably mounted to the body.

8. The pressure regulator as claimed in claim 7, wherein the arm comprises a first end adapted to close the body inlet and a second end operatively connected to the resilient shutoff member and the regulating member.

9. The pressure regulator as claimed in claim 8, wherein the linking member has a first end connected to the resilient shutoff member and a second end connected to the arm, the resilient shutoff member extending between the body and the linking member for moving the linking member relative to the body.

10. The pressure regulator as claimed in claim 8, wherein the linking member further comprises an opening located near its lower end for receiving the second end of the arm.

11. The pressure regulator as claimed in claim 10, wherein the arm is unattached to the linking member and further wherein the opening is wider than the second end of the arm to allow the arm to pivot within the opening when the linking member moves towards and away from the resilient shutoff member.

12. The pressure regulator as claimed in claim 1, wherein the resilient regulating member is adjustable to allow the nominal pressure to be adjusted.

13. The pressure regulator as claimed in claim 1, wherein the nominal pressure is about 2.758 kPag.

14. The pressure regulator as claimed in claim 2, wherein the control pressure is greater than 3.447 kPag.

15. The pressure regulator as claimed in claim 5, wherein at least of a portion of the pressure control chamber is adjacent to at least a portion of the fluid passageway.

16. The pressure regulator as claimed in claim 1, wherein the resilient shutoff member is a helical spring.

* * * * *